United States Patent
Wall et al.

(10) Patent No.: US 6,244,256 B1
(45) Date of Patent: Jun. 12, 2001

(54) HIGH-TEMPERATURE COOLANT LOOP FOR COOLED EXHAUST GAS RECIRCULATION FOR INTERNAL COMBUSTION ENGINES

(75) Inventors: John C. Wall, Columbus, IN (US); Markus Flik, Stuttgart (DE); Hans Lange, Charleston, SC (US)

(73) Assignees: Behr GmbH & Co., Stuttgart (DE); Cummins Engine Company, Inc., Columbus, IN (US); Behr America, Inc., Charleston, SC (US)

( * ) Notice: Subject to any disclaimer, the term of this patent is extended or adjusted under 35 U.S.C. 154(b) by 0 days.

(21) Appl. No.: 09/413,873

(22) Filed: Oct. 7, 1999

(51) Int. Cl.$^7$ .................................................. F02B 47/08
(52) U.S. Cl. ..................................... 123/568.12; 60/605.2
(58) Field of Search ........................... 123/568.12, 41.31, 123/41.44, 41.51, 559.1, 559.2; 60/605.2

(56) References Cited

U.S. PATENT DOCUMENTS

| | | | |
|---|---|---|---|
| 3,918,412 | 11/1975 | Lindstrom | 123/3 |
| 4,003,969 | 1/1977 | Robinson | 261/145 |
| 4,393,853 | 7/1983 | Groves | 123/568 |
| 4,561,387 | 12/1985 | Koerkemeier et al. | 123/41.31 |
| 4,885,911 | 12/1989 | Woollenweber | 60/597 |
| 4,961,404 | 10/1990 | Itakura et al. | 123/41.31 |
| 5,163,295 | 11/1992 | Bradshaw | 60/605.2 |
| 5,353,757 | 10/1994 | Susa et al. | 123/41.29 |
| 5,394,854 | 3/1995 | Edmaier et al. | 123/563 |
| 5,440,880 | 8/1995 | Ceynow et al. | 60/605.2 |
| 5,533,487 | 7/1996 | Cailey | 123/568 |
| 5,607,010 | 3/1997 | Schoenfeld et al. | 165/51 |
| 5,611,202 | 3/1997 | Sumser et al. | 60/605.2 |
| 5,690,082 | 11/1997 | Tanioka et al. | 123/570 |
| 5,711,154 * | 1/1998 | Baechle et al. | 60/605.2 |
| 5,732,688 | 3/1998 | Charlton et al. | 123/570 |
| 5,740,786 | 4/1998 | Gaertner | 123/570 |
| 5,791,146 | 8/1998 | Dunger | 60/605.2 |
| 5,794,445 | 8/1998 | Dungner | 60/605.2 |
| 5,802,846 | 9/1998 | Bailey | 60/278 |
| 5,927,075 * | 7/1999 | Khair | 60/605.2 |

OTHER PUBLICATIONS

M. Banzhaf et al., Heat Exchanger for Cooled Exhuast Gas Recirculation, (1997).

* cited by examiner

Primary Examiner—Noah P. Kamen
Assistant Examiner—Hai Huynh
(74) Attorney, Agent, or Firm—Foley & Lardner

(57) ABSTRACT

An EGR system for an internal combustion engine has a separate, secondary high-temperature cooling loop, in addition to a primary cooling loop. In the secondary cooling loop, coolant flows through a secondary high-temperature exhaust gas cooler, which is located upstream of the primary exhaust gas cooler. A large amount of heat is transferred from the exhaust gases to the coolant in the secondary high-temperature cooling loop. The heat absorbed by the high-temperature coolant is rejected in a secondary high-temperature radiator. Heat absorbed by the primary coolant is rejected in a primary radiator. The two radiators occupy the same amount of frontal area as a single radiator used in a conventional single-stage EGR cooling system, but overall reject more heat to the ambient.

In an alternate arrangement, the EGR system for a liquid-cooled internal combustion engine has a single exhaust gas cooler which is cooled by an EGR cooling loop that is independent of the engine cooling system. The EGR cooling loop includes a secondary radiator located adjacent the primary engine cooling radiator, and the two radiators together occupy the same frontal area as a single radiator used in a conventional single-stage EGR cooling system, but overall reject more heat to the ambient.

26 Claims, 3 Drawing Sheets

HIGH-TEMPERATURE COOLANT LOOP FOR COOLED EXHAUST GAS RECIRCULATION FOR INTERNAL COMBUSTION ENGINES

BACKGROUND OF THE INVENTION

1. Field of the Invention

The invention relates to a cooling system for cooling the recirculated exhaust gases of an internal combustion engine.

2. Description of Related Art

Stringent exhaust gas emission regulations for internal combustion engines, especially diesel engines, have led to the development of new emission-reducing technologies. One such technology is the cooled exhaust gas recirculation ("EGR") method which reduces emissions with only a slight increase in fuel consumption. The heat exchanger of an EGR system must be capable of meeting high demands in terms of compact design, performance, and resistance to high temperatures, corrosion and fouling.

In a known EGR system, as shown in FIG. 1, a turbocharged diesel engine 1 has an exhaust gas cooler (heat exchanger) 2, a radiator 3 and a charge air cooler 4. Outside air is drawn into the intake system through the compressor 5 of an exhaust-driven turbocharger having a turbine 7. Exhaust gas emitted from the diesel engine 1 passes through a valve 6 that controls the amount of exhaust gas that flows through the remainder of the exhaust system, including turbine 7, to the ambient.

Valve 6 also controls the amount of exhaust gas that is recirculated and mixed with the charge air. The exhaust gas that enters the EGR system flows through the exhaust gas cooler 2, where it transfers heat to the engine coolant circulating in the engine cooling system loop 9 by means of pump 8. After the exhaust gas has been cooled in the exhaust gas cooler 2, it is admixed at 6a with cooled intake air prior to entering the diesel engine.

The coolant circulating in the engine coolant loop 9 has already absorbed combustion heat from engine 1 when it arrives at exhaust gas cooler 2. In exhaust gas cooler 2 additional heat is transferred to the coolant from the exhaust gas. The hot coolant then flows via pump 8 to radiator 3 where heat is rejected to the ambient air. Because the coolant carries more heat from the exhaust gas cooler 2 than it would otherwise carry if it were only cooling the engine 1, more heat must be rejected in the radiator 3. This requires an increase in the frontal area of the radiator 3. In present commercial vehicles, however, the radiator already occupies the available frontal area. A further increase in the frontal area thus is not possible.

Another cooling system is disclosed in U.S. Pat. No. 5,607,010, in which at least two heat exchangers are serially arranged to cool the exhaust gases in an EGR system for a diesel engine. The cooling of the exhaust gases thus takes place in stages, at progressively lower operating temperature ranges. The serial arrangement allows each heat exchanger to be optimally tailored for its own temperature-specific cooling task, thus preventing contamination and/or corrosion from forming in the heat exchangers. This patent, however, does not describe the coolant circuit(s) for these heat exchangers, i.e., whether or how they may relate to each other or to the cooling system for the engine, or the location of the radiators. As noted above, in present day commercial vehicles, the entire frontal area is already occupied by a single radiator and thus an increased frontal radiator area is not possible.

SUMMARY OF THE INVENTION

It is, therefore, a general object of the invention to provide a cooling system for an EGR system that obviates or minimizes difficulties of the type previously described.

It is a more specific object of the invention to provide a more effective and efficient system for cooling the exhaust gases in an EGR system.

It is another object of the invention to provide a more effective and efficient cooling system for a vehicle internal combustion engine having an EGR system with no increase in the radiator frontal area of the vehicle.

These and other objects of the invention are accomplished by providing an exhaust gas cooling system for cooling exhaust gas in the exhaust gas recirculation system of an internal combustion engine prior to admixing with charge air for the engine. In one embodiment of the invention, the exhaust gas cooling system has a primary cooling loop, which includes a primary radiator; a primary exhaust gas cooler in fluid communication with the primary radiator; and a primary pump that circulates coolant through the primary cooling loop from the primary exhaust gas cooler to the primary radiator and back to the primary exhaust gas cooler. The exhaust gas cooling system also has a secondary high temperature cooling loop, which includes a secondary radiator; a secondary exhaust gas cooler in fluid communication with the secondary radiator; and a secondary pump that circulates coolant through the secondary cooling loop from the secondary exhaust gas cooler to the secondary radiator and back to the secondary exhaust gas cooler. In this arrangement, recirculated exhaust gas is cooled first in the secondary exhaust gas cooler, and then is cooled further in the primary exhaust gas cooler.

The invention also encompasses an EGR system with these features, and a motor vehicle equipped with such a system.

In another embodiment of the invention, the exhaust gas cooling system is part of a liquid-cooled internal combustion engine having an engine cooling system with an engine cooling loop, including a primary radiator, and an exhaust gas recirculation system with an EGR valve. The system has a single exhaust gas cooler and an EGR cooling loop which is independent of the engine cooling loop and comprises a secondary radiator adjacent the primary radiator, and an EGR coolant pump for circulating coolant through the EGR cooling loop from the exhaust gas cooler to the secondary radiator and back to the exhaust gas cooler. The engine may be installed in a motor vehicle.

Additional objects, advantages, and features of the invention will be apparent from the following description.

BRIEF DESCRIPTION OF THE DRAWING

The accompanying drawing figures, which are incorporated in and constitute a part of the specification, illustrate the presently preferred embodiments of the invention and, together with the above general description and the following detailed description of the preferred embodiments, serve to explain the principles of the invention.

DETAILED DESCRIPTION OF THE PREFERRED EMBODIMENTS

Figure 2:
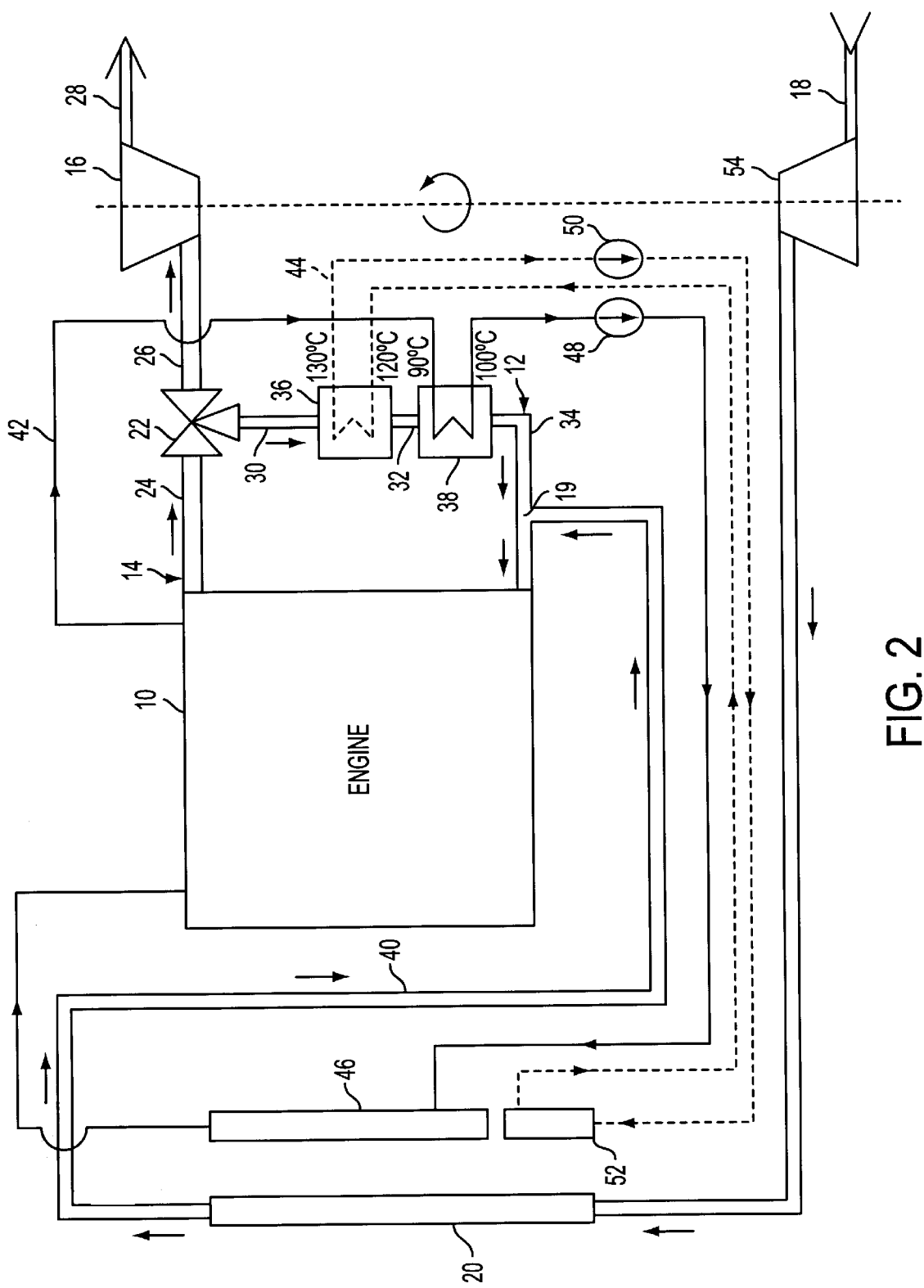
FIG. 2 is a schematic of the cooling system for an exhaust gas recirculation system according to one embodiment of the invention, as applied to a turbocharged diesel engine.

FIG. 2 depicts a two-stage recirculated exhaust gas cooling system according to the invention, applied to a turbocharged vehicular diesel engine 10 with an EGR system 12. The EGR system 12 is normally installed on the high-pressure side of the turbocharger. Thus, the exhaust gas to be cooled and recirculated is bled from the main exhaust gas stream 14 between the engine exhaust manifold and the turbine 16 of the turbocharger and is admixed with fresh air 18 at juncture 19, downstream of the charge air cooler 20. The EGR system includes an EGR valve 22, which controls the recirculated exhaust gas flow rate, exhaust gas pipes 24, 30, 32, 34, a secondary exhaust gas cooler 36, and a primary exhaust gas cooler 38. Exhaust gas coolers 36, 38 are heat exchangers that transfer heat from the exhaust gas to liquid coolants, as described below.

A first exhaust pipe 24 extends from the exhaust manifold of the diesel engine to the EGR valve 22. The EGR valve 22 controls the amount of exhaust gas that is bled from the exhaust system and enters the EGR system 12. From the EGR valve 22, a second pipe 26 carries exhaust gas to turbine 16. A third pipe 28 carries spent exhaust gas from the turbine to the ambient.

Pipe 30 extends from the EGR valve to the secondary (high-temperature) exhaust gas cooler 36. Pipe 32 interconnects cooler 36 with the primary exhaust gas cooler 38. Exhaust gas thus flows sequentially through secondary cooler 36, primary cooler 38 and pipe 34.

Air is taken from the ambient via inlet 18 through the turbocharger compressor 54 and fed to the charge air cooler 20 at the front of the vehicle, where it is cooled by air flowing through the charge air cooler due to forward motion of the vehicle and/or the action of a cooling fan (not shown). Once cooled, the charge air travels through the intake conduit 40 and is then admixed at 19 with the cooled exhaust gases flowing from the EGR coolers 36, 38. This mixture then enters the diesel engine 10 through the intake manifold.

There are two cooling loops in the EGR system 14—the primary cooling loop 42 and the secondary high-temperature cooling loop 44. The primary cooling loop 42 is part of the engine cooling system, and cools the primary exhaust gas cooler 38 of the EGR system 14. The secondary cooling loop 44 cools the secondary exhaust gas cooler 36 of the EGR system 14.

In the primary cooling loop 42, the primary (engine) coolant flows from the radiator 46 at the front of the vehicle through coolant hoses to cool the engine 10. From engine 10, the coolant flows through the primary exhaust gas cooler 38 to cool recirculated exhaust gas in EGR system 14. The coolant then flows back to the primary radiator 46, where it rejects the absorbed heat. Pump 48, which may be the engine-driven coolant pump or an auxiliary pump, serves to circulate the primary coolant through the primary cooling loop 42.

In secondary cooling loop 44, a high-temperature coolant flows through the secondary (high-temperature) exhaust gas cooler 36. A large amount of heat is transferred from the very hot exhaust gases to the coolant in the secondary high-temperature exhaust gas cooler 36. The high-temperature coolant then flows to a secondary high-temperature radiator 52 at the front of the vehicle, where it rejects the heat absorbed in the secondary exhaust gas cooler 36. Pump 50 is electrically driven and serves to circulate the high-temperature coolant through the secondary cooling loop 44.

In trucks and passenger cars the temperature of the exhaust gas leaving the engine can reach up to 700° C. and 450° C., respectively. The required exhaust gas outlet temperatures are normally in the range of 150° C. to 200° C. Accordingly, in truck and passenger car applications, the amount of heat that must be dissipated from the recirculated exhaust gas can reach up to 45 kW and 5 kW, respectively. The secondary high-temperature exhaust gas cooler 36 absorbs a large amount of this heat from the exhaust gases because of the high initial temperature of the exhaust gases. This places less demand on the primary cooling loop to reject heat from the EGR system and keeps engine operating temperatures within design limits.

The secondary high-temperature radiator 52 and the primary radiator 46 require a smaller frontal area to reject the same amount of heat as the normal radiator of a conventional EGR system (such as radiator 3 shown in FIG. 1) having only one EGR cooler. This is due to the larger temperature difference between the high-temperature coolant and the ambient cooling air. As a result, more effective EGR cooling is accomplished without increasing the frontal area of the radiator. For a given cooling effect on the exhaust gases, the primary radiator 46 and the secondary high-temperature radiator 52 have a combined frontal area that actually is smaller than the frontal area of the single radiator 3 of the single-stage EGR cooling system of FIG. 1. This is illustrated by the following example.

In a two-stage exhaust gas cooler according to FIG. 2 of the invention, the coolant entry temperature at the primary cooler 38 is 90° C., while the coolant entry temperature at secondary cooler 36 is 120° C. The heat absorbed by the coolants raises their temperatures by about 10° C.: the coolant exiting the primary cooler 38 is at 100° C., while the coolant exiting the secondary cooler 36 is at 130° C. Radiator 52 thus operates in a higher coolant temperature range than parallel radiator 46. For a given frontal area, therefore, radiator 52 can reject a greater amount of heat to the cooling air flowing through the radiators (which typically is at a temperature of 44° C.). Conversely, for a given cooling effect, radiator 52 can be smaller than radiator 46. Of course, the secondary high-temperature cooling loop 44 would operate at a higher pressure than the primary cooling loop 44 in order to prevent boiling of the coolant.

Figure 1:
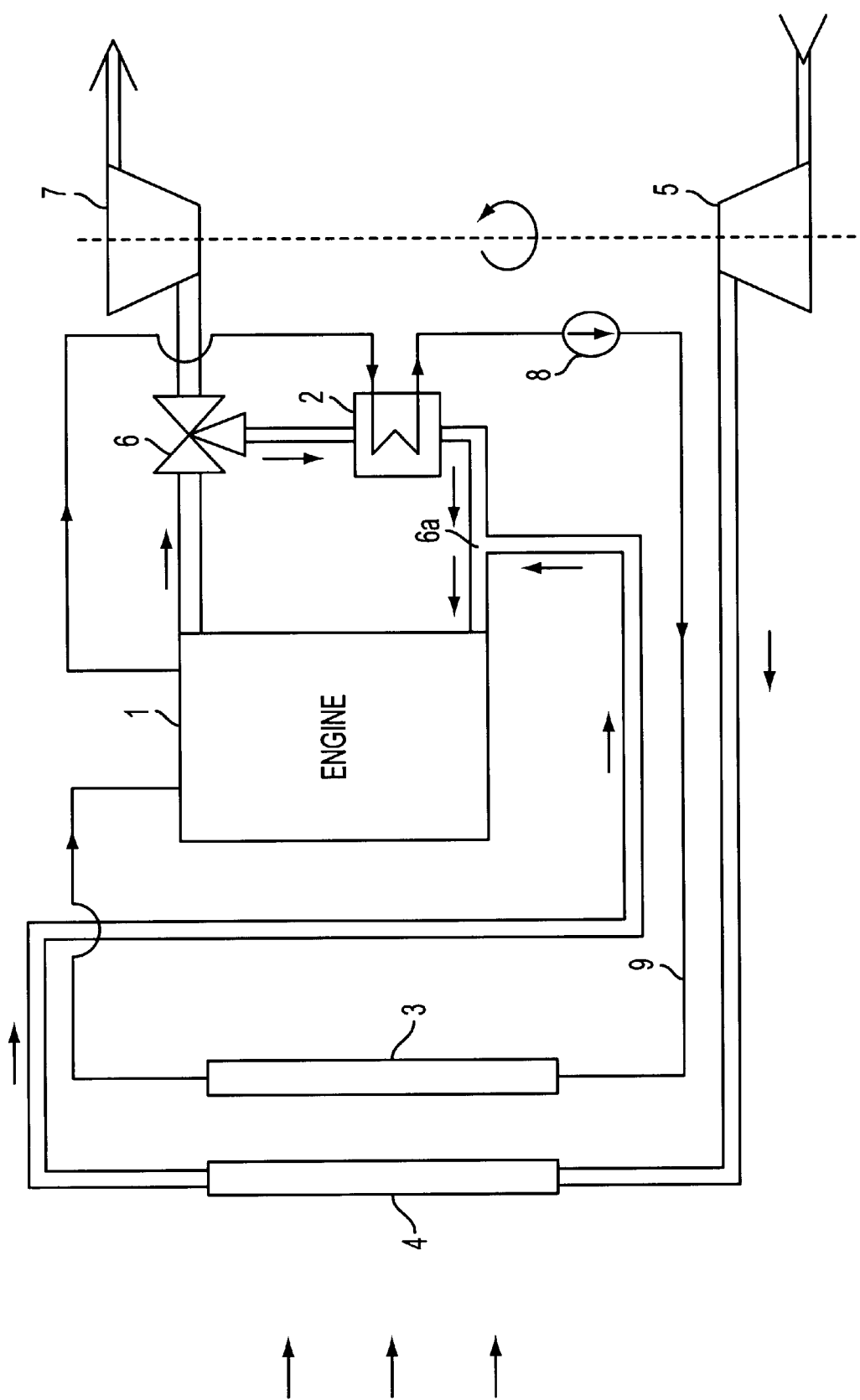
FIG. 1 is a schematic of a known cooling system for a turbocharged diesel engine and an exhaust gas recirculation system for the diesel engine.

In a conventional single-stage EGR cooling system such as that shown in FIG. 1, radiator 3 functions alone to remove engine and exhaust gas heat from the single coolant loop and would, for example, have a height of 1200 mm. For the same marginal operating conditions and equal radiator width, a comparable two-stage cooling system according to the invention (FIG. 2), in which 50% of the exhaust gas heat is removed in the secondary high-temperature cooling loop 44 and 50% of the engine heat is removed in the primary cooling loop 42, requires a combined radiator height (radiators 46 and 52) of only 1174 mm—a 26 mm saving of space.

Figure 3:
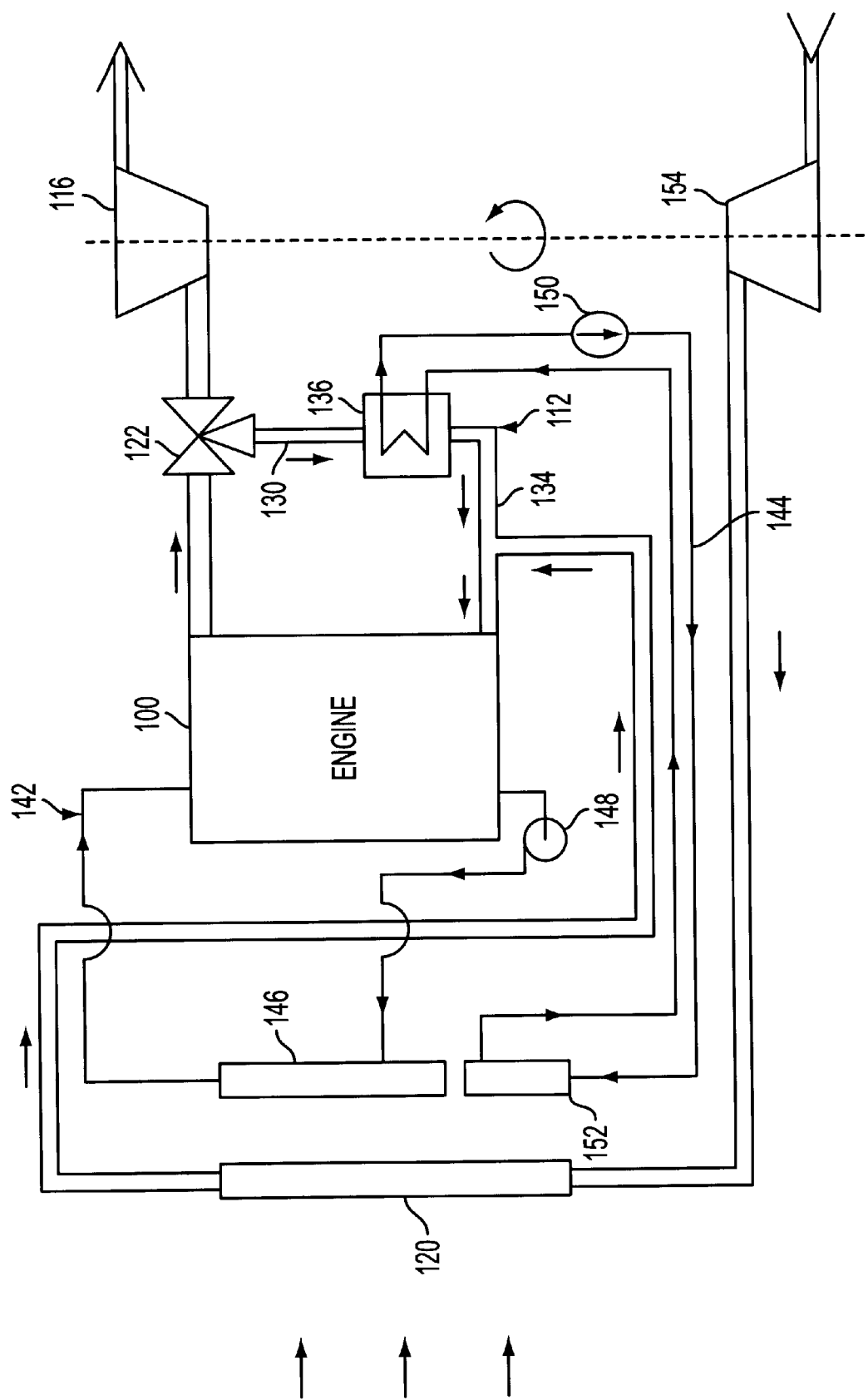
FIG. 3 is a schematic of the cooling system for an exhaust gas recirculation system according to another embodiment of the invention, as applied to a turbocharged diesel engine.

FIG. 3 depicts an alternate embodiment of the invention, having a single-stage EGR cooling system which is independent of the engine cooling system. The EGR cooling system of this embodiment is shown, as in FIG. 2, applied to a turbocharged vehicular diesel engine 100 having an EGR system 112. As compared to FIG. 2, like parts illustrated in FIG. 3 are denoted with like 100-series reference numerals.

In this embodiment, engine 100 is cooled by an engine cooling loop 142 which includes a coolant pump 148 and a primary radiator 146 at the front of the vehicle. Air is supplied by compressor 154 and is cooled in charge air cooler 120 before reaching the engine. Compressor 154 is driven by the turbine 116 of the turbocharger. The exhaust gas recirculation system 112 includes EGR valve 122, pipe 130, exhaust gas cooler 136 and pipe 134. An EGR high temperature cooling loop 144 includes an EGR coolant pump 150 which circulates coolant from exhaust gas cooler 136 to a secondary radiator 152, and back to cooler 136. EGR cooling loop 144 is independent of engine cooling loop 142.

Secondary radiator 152 is mounted adjacent primary radiator 146. For given cooling effects on the exhaust gases and the engine coolant, the primary radiator 146 and the secondary radiator 152 have a combined frontal area that is actually smaller than the frontal area of the single radiator 3 of the conventional single-stage EGR cooling system of FIG. 1. This is illustrated by the following example.

As mentioned above, radiator 3 of the conventional single-stage EGR cooling system of FIG. 1 would have a height of 1200 mm. For the same marginal operating conditions and equal radiator width, a comparable single-stage cooling system according to the embodiment of FIG. 3 of the invention requires a combined radiator height (radiators 146 and 152) of only 1120 mm—an 80 mm saving of space. This is due to the fact that primary radiator 146 (FIG. 3) need not be as large as radiator 3 of the conventional system (FIG. 1) because radiator 146 is not burdened with an additional heat load from an exhaust gas cooler. Also, because secondary radiator 152 operates at higher temperatures than primary radiator 146, radiator 152 need not be as large as radiator 146 to achieve a given cooling effect.

The combined frontal area of radiators 146 and 152 (FIG. 3) is even smaller than the combined frontal area of radiators 46 and 52 in the embodiment of FIG. 2. For example, for the same marginal operating conditions and equal radiator width, a comparable single-stage cooling system according to the embodiment of FIG. 3 requires a combined radiator height that is 54 mm lower than the combined radiator height of the embodiment of FIG. 2 (1174 mm–1120 mm). This is due to the fact that primary radiator 146 (FIG. 3) can be smaller than primary radiator 46 (FIG. 2) because radiator 146 is not burdened with an additional heat load from an exhaust gas cooler. Also, because secondary radiator 152 (FIG. 3) must dissipate the entire heat load of the EGR cooling system delivered from sole exhaust gas cooler 136, radiator 152 operates at higher temperatures than secondary radiator 52 (FIG. 2), which dissipates only part of the EGR heat load (that delivered from secondary exhaust gas cooler 36). For a given frontal area, therefore, radiator 152 can reject a greater amount of heat than radiator 52.

The EGR cooling system of the invention is applicable to any type of internal combustion engine, and to stationary as well as vehicular applications. Additional advantages and modifications of either of the above-described embodiments will readily occur to those skilled in the art. Therefore, the invention in its broader aspects is not limited to the specific details, and representative devices, shown and described herein. Accordingly, various modifications may be made without departing from the spirit or scope of the invention as defined by the appended claims.

What is claimed is:

1. An exhaust gas cooling system for cooling exhaust gas in the exhaust gas recirculation system of an internal combustion engine prior to admixing with charge air for the engine, the exhaust gas cooling system comprising:
    a primary cooling loop including:
        a primary radiator; and
        a primary pump that circulates coolant through the primary cooling loop to the primary radiator; and
    a secondary cooling loop including:
        secondary radiator;
        a secondary exhaust gas cooler in fluid communication with the secondary radiator; and
        a secondary pump that circulates coolant through the secondary cooling loop from the secondary exhaust gas cooler to the secondary radiator and back to the secondary exhaust gas cooler.

2. A cooling system as claimed in claim 1, wherein the engine is liquid-cooled, and the primary cooling loop is part of the engine cooling system, and further comprising a primary exhaust gas cooler in fluid communication with the primary radiator such that the primary pump that circulates coolant through the primary cooling loop from the primary exhaust gas cooler to the primary radiator and back to the primary exhaust gas cooler, and wherein recirculating exhaust gas is cooled first in the secondary exhaust gas cooler, and then is cooled in the primary exhaust gas cooler.

3. A cooling system as claimed in claim 2, wherein the primary radiator is the radiator of the engine cooling system.

4. A cooling system as claimed in claim 3, wherein the secondary radiator has a smaller frontal area than the primary radiator.

5. A cooling system as claimed in claim 1, wherein the secondary radiator has a smaller frontal area than the primary radiator.

6. A cooling system as claimed in claim 5, wherein the engine is a diesel engine.

7. A cooling system as claimed in claim 1, further comprising a turbocharge-air cooling circuit, comprising a charge-air cooler and a compressor for compressing ambient air and circulating compressed charge air to the charge-air cooler and from the charge-air cooler to the engine.

8. A cooling system as claimed in claim 7, further comprising a turbine driven by exhaust gas, which turbine drives the compressor.

9. A cooling system as claimed in claim 7, wherein the charge-air cooler is positioned in front of the primary and secondary radiators, in a direction of forward vehicle travel, and defines a cooling area that is equal to the sum of cooling areas defined by the primary and secondary radiators.

10. In an exhaust gas recirculation system for an internal combustion engine, the system comprising an EGR valve for controlling the flow of exhaust gas diverted from the engine exhaust gas stream and recirculated to the engine intake, and a primary cooling loop including a primary exhaust gas cooler located downstream of the EGR valve in the direction of recirculated exhaust gas flow, a primary radiator and a primary pump for circulating coolant through the primary cooling loop, the improvement comprising:
    a secondary cooling loop comprising:
        a secondary exhaust gas cooler located upstream of the primary exhaust gas cooler in the direction of recirculated exhaust gas flow;
        a secondary radiator having a smaller frontal area than the primary radiator; and
        a secondary pump for circulating coolant through the secondary cooling loop from the secondary exhaust gas cooler to the secondary radiator and back to the secondary exhaust gas cooler.

11. An exhaust gas recirculation system as claimed in claim 10, wherein the engine is liquid-cooled, and the primary cooling loop is part of the engine cooling system.

12. An exhaust gas recirculation system as claimed in claim 11, wherein the primary radiator is the radiator of the engine cooling system.

13. In an internal combustion engine having an exhaust gas recirculation system comprising an EGR valve for controlling the flow of exhaust gas diverted from the engine exhaust gas stream and recirculated to the engine intake, a primary cooling loop including a primary exhaust gas cooler located downstream of the EGR valve in the direction of recirculated exhaust gas flow, a primary radiator and a primary pump for circulating coolant through the primary cooling loop, the improvement comprising:

a secondary cooling loop comprising:

a secondary exhaust gas cooler located upstream of the primary exhaust gas cooler in the direction of recirculated exhaust gas flow;

a secondary radiator having a smaller frontal area than the primary radiator; and a secondary pump for circulating coolant through the secondary cooling loop from the secondary exhaust gas cooler to the secondary radiator and back to the secondary exhaust gas cooler.

14. An internal combustion engine as claimed in claim 13, wherein the engine is liquid-cooled, and the primary cooling loop is part of the engine cooling system.

15. An internal combustion engine as claimed in claim 14, wherein the primary radiator is the radiator of the engine cooling system.

16. In a motor vehicle having an internal combustion engine with an exhaust gas recirculation system for the engine, the system comprising an EGR valve for controlling the flow of exhaust gas diverted from the engine exhaust gas stream and recirculated to the engine intake, and a primary cooling loop including a primary exhaust gas cooler located downstream of the EGR valve in the direction of recirculated exhaust gas flow, a primary radiator at the front of the vehicle, and a primary pump for circulating coolant through the primary cooling loop, the improvement comprising:

a secondary cooling loop for the exhaust gas recirculation system comprising:

a secondary exhaust gas cooler located upstream of the primary exhaust gas cooler in the direction of recirculated exhaust gas flow;

a secondary radiator adjacent the primary radiator, the secondary radiator having a smaller frontal area than the primary radiator; and a secondary pump for circulating coolant through the secondary cooling loop from the secondary exhaust gas cooler to the secondary radiator and back to the secondary exhaust gas cooler.

17. A motor vehicle as claimed in claim 16, wherein the engine is liquid-cooled, and the primary cooling loop is part of the engine cooling system.

18. A motor vehicle as claimed in claim 17, wherein the primary radiator is the radiator of the engine cooling system.

19. A motor vehicle as claimed in claim 18, wherein the engine is a diesel engine.

20. A motor vehicle as claimed in claim 18, wherein the primary radiator and the secondary radiator together occupy the entire frontal area of the vehicle available for radiator cooling.

21. A motor vehicle as claimed in claim 16, wherein the primary radiator and the secondary radiator together occupy the entire frontal area of the vehicle available for radiator cooling.

22. In a motor vehicle having a liquid-cooled internal combustion engine comprising:

an engine cooling system having an engine cooling loop including a primary radiator at the front of the vehicle, and an exhaust gas recirculation system having an EGR valve for controlling the flow of exhaust gas diverted from the engine exhaust gas stream and recirculated to the engine intake, and an exhaust gas cooler located downstream of the EGR valve in the direction of recirculated exhaust gas flow, the improvement comprising:

an EGR cooling loop for the exhaust gas cooler which is independent of the engine cooling loop and comprises:

a secondary radiator adjacent the primary radiator; and an EGR coolant pump for circulating coolant through the EGR cooling loop from the exhaust gas cooler to the secondary radiator and back to the exhaust gas cooler.

23. A motor vehicle as claimed in claim 22, wherein the engine is a diesel engine.

24. A motor vehicle as claimed in claim 22, wherein the primary radiator and the secondary radiator together occupy the entire frontal area of the vehicle available for radiator cooling.

25. In a liquid-cooled internal combustion engine comprising:

an engine cooling system having an engine cooling loop including a primary radiator, and an exhaust gas recirculation system having an EGR valve for controlling the flow of exhaust gas diverted from the engine exhaust gas stream and recirculated to the engine intake, and an exhaust gas cooler located downstream of the EGR valve in the direction of recirculated exhaust gas flow, the improvement comprising:

an EGR cooling loop for the exhaust gas cooler which is independent of the engine cooling loop and comprises:

a secondary radiator adjacent the primary radiator; and an EGR coolant pump for circulating coolant through the EGR cooling loop from the exhaust gas cooler to the secondary radiator and back to the exhaust gas cooler.

26. An engine as claimed in claim 25, wherein the engine is a diesel engine.

\* \* \* \* \*